June 22, 1965 W. R. BURGESS ETAL 3,190,320
RESIN TRANSFER PLANT
Filed Nov. 28, 1961 2 Sheets-Sheet 1
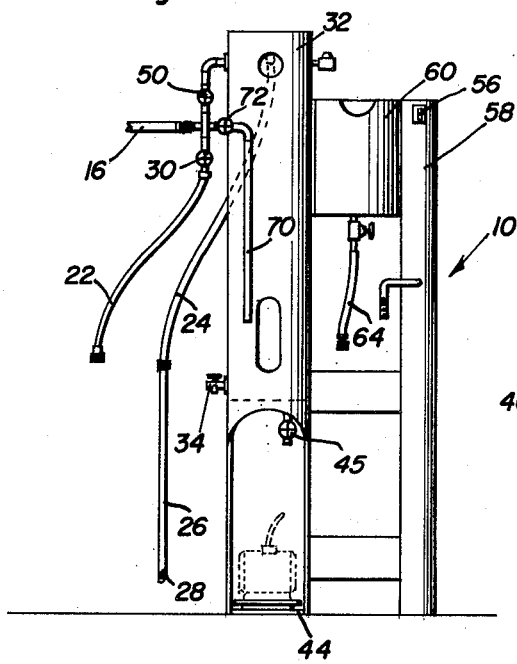
Fig. 1
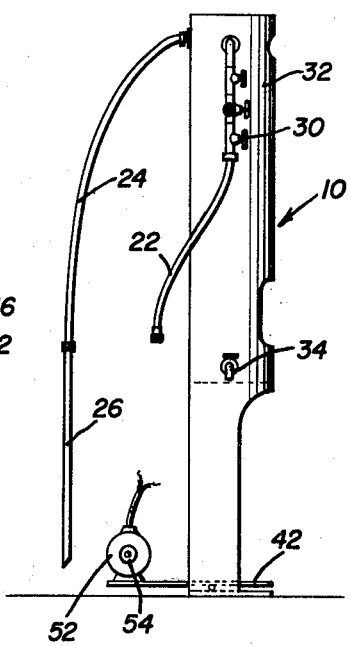
Fig. 2
Fig. 4
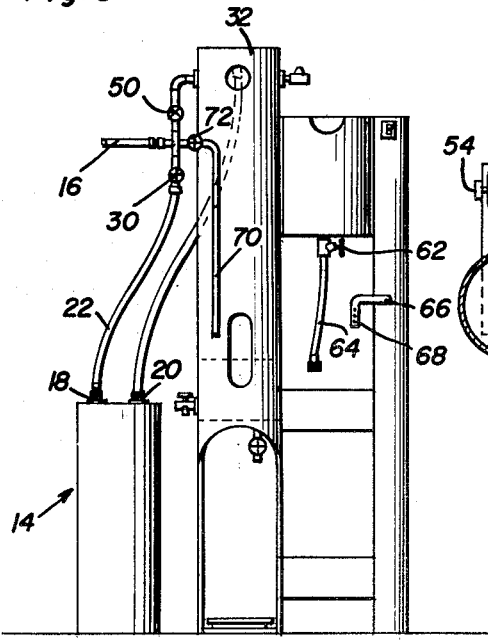
Fig. 3
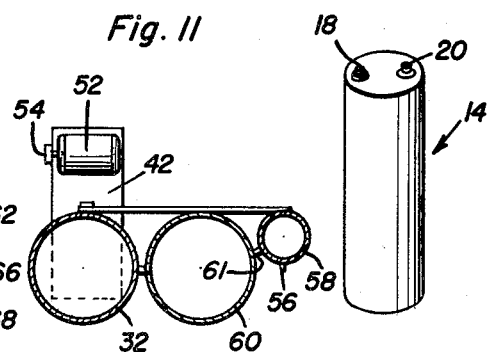
Fig. 5
Fig. 11
William R. Burgess
Charles D. Riley
INVENTORS June 22, 1965 W. R. BURGESS ETAL 3,190,320
RESIN TRANSFER PLANT
Filed Nov. 28, 1961 2 Sheets-Sheet 2

William R. Burgess
Charles D. Riley
INVENTORS

United States Patent Office 3,190,320
Patented June 22, 1965

3,190,320
RESIN TRANSFER PLANT
William R. Burgess and Charles D. Riley, El Paso, Tex.,
assignors to Continental Water Conditioning Corporation, El Paso, Tex., a corporation of Texas
Filed Nov. 28, 1961, Ser. No. 155,397
8 Claims. (Cl. 141—1)

The present invention generally relates to a novel device for transferring water conditioning ingredients from a supply vessel to a service unit.

The present invention is especially useful, although not confined to, the transfer of a mixture of cation exchange and anion exchange resins from a supply vessel into service equipment and the removal of these conditioning ingredients from the service units back to the supply vessels. This invention overcomes certain problems existent in the transfer of water conditioning ingredients such as the possible introduction of contaminants to water conditioning systems, loss of costly conditioning ingredients due to poor handling techniques, providing prescribed amounts and uniform quantities of conditioning ingredients to water conditioners, removing water conditioning ingredients from service units without loss or mess and especially the problem of keeping uniform proportions of two or more different types of water conditioning ingredients such as those employed in mixed bed demineralization such as disclosed in co-pending applications Serial Nos. 697,649, filed November 20, 1957, for Apparatus for Preparing Mineral Free Water and 791,138, filed February 4, 1959, for Apparatus for Preparing Mineral Free Water.

As disclosed in the above mentioned applications, there is provided a demineralized water service unit for users of quality, mineral free water. There is also provided a regeneration plant so that a regeneration service may be provided for the distributors of the service unit. This requires that the water conditioning ingredients in the service units be shipped to centrally located regeneration stations where the resins are regenerated and returned to the distributor. Accordingly, the resin transfer plant of the present invention provides a fast, efficient, waste free and clean method of transferring the water conditioning ingredients from the service unit to a supply vessel and from a supply vessel to a service unit.

A further important object of the present invention is to provide a demineralizer in the water line to the resin transfer plant so that the capacity of the resin transferred from the plant into the service unit will not be reduced thereby enabling a hydraulic transfer of the resins without affecting the quality of the resins.

These together with other objects and advantages which will become subsequently apparent reside in the details of construction and operation as more fully herinafter described and claimed, reference being had to the accompanying drawings forming a part hereof, wherein like numerals refer to like parts throughout, and in which:

FIGURE 1 is a front elevational view of the resin transfer plant of the present invention;

FIGURE 2 is a side elevational view of the construction of FIGURE 1;

FIGURE 3 is a view similar to FIGURE 1 but illustrating the resin transfer plant being charged from a shipping canister or container;

FIGURE 4 is a perspective view of a service unit;

FIGURE 5 is a perspective view of a shipping canister or supply vessel;

FIGURE 11 is a transverse sectional view of the plant.

Figure 6:
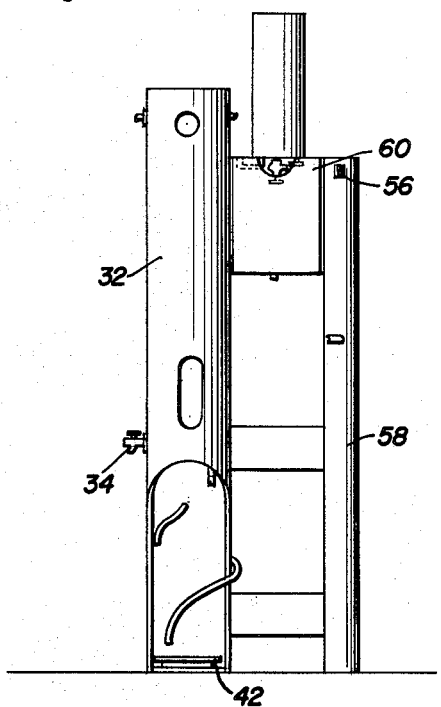
FIGURE 6 is a front view illustrating the resin transfer plant being used to drain used or expended resin from the service unit.
Figure 7:
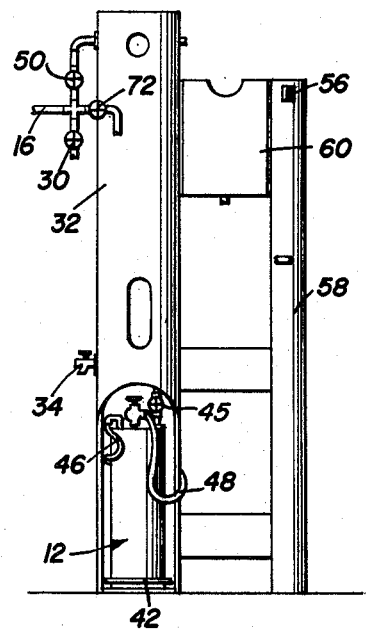
FIGURE 7 is a front view illustrating the service unit being charged while adding water to the resin transfer plant.

Referring now specifically to the drawings, the numeral 10 generally designates the resin transfer plant of the present invention for use in transferreing resins between a service unit generally designated by the numeral 12 and a supply vessel or canister generally designated by the numeral 14. The canister 14 is supplied to the distributor with regenerated resins therein and is returned by the distributor to a central regeneration plant with the used resin and the transfer plant 10 of the present invention is used by the distributor in transferring the regenerated resins received in the canister to a plurality of service units 12 and returning the resins from a plurality of service units to an empty canister.

The resin transfer plant of the present invention is provided with a water inlet conduit or pipe 16 of any suitable construction and such water inlet pipe 16 may be connected with a demineralizer such as the service unit 12 for purposes of using only demineralized water for use in transferring the regenerated resins so that the capacity of the resins being transferred will not be reduced.

The resin canister 14 is provided with two top openings or fittings 18 and 20 both of which are equipped with a suitable quick disconnecting fitting. The canister 14 is disposed to the left of the transfer plant 10 and conduit or line 22 is connected to opening or fitting 18 while a line 24 having an elongated manifold 26 with an inclined lower end 28 is inserted through the opening 20 with the open lower end of the manifold 26 being disposed adjacent but spaced from the bottom of the canister 14 as illustrated in FIGURE 3. A valve 30 in the conduit 22 may then be opened so that water will pass down through the conduit 22 into the top of the canister thus forcing regenerated resins from the canister through the bottom of the manifold 26 and into the filler tube 24 and thus into the hollow tank 32 which forms the upper portion of the resin transfer plant. In this way, all of the conditioning ingredients are transferred to the tank or filler tube at which time valve 30 may be closed. A drain valve 34 is provided in the tank or filler tube 32 for controlling the liquid level therein.

The next step is transferring the regenerated resin from the filler tube or tank 32 into the service unit 12 which includes a filler plug 36, a water inlet 38 and a water outlet or spigot 40. The filler plug 36 is removed and the service unit 12 is placed on a platform 42 movably supported on a base 44 at the bottom of the resin transfer plant. The unit is filled by opening valve 45 for discharging the regenerated resin into the service unit 12. Drain lines 46 and 48 are connected to the outlet 40 and inlet valve 38 respectively which are for the purpose of carrying overflow water from the service unit to the drain 34. In the event additional water is required in the filler tank 32, a valve 50 is provided for allowing water to proceed from the water inlet line 16 into the filler tank 32.

During the filling of the service unit 12 with regenerated resins, a very important feature of the present invention is used. Inasmuch as unit capacity varies in direct proportion to the quantity of conditioning ingredients within the service unit, it is desirable to offer the highest available capacity from the service unit. In order to accomplish this, there is provided a method of vibrating the service units during the resin filling operation which consists of the platform 42 which is a vibrating platform and provided with an electric motor 52 mounted thereon including an eccentric rotating weight 54 so that the platform 42 will be vibrated. A switch 56 is provided for controlling the vibrator and the switch 56 is mounted in a plastic tubular supporting member 58 in order to eliminate any possibility of water getting into the circuit and the member 58, tank 60 and tank 32 are interconnected by a plastic sheet or sheets 61. After the service unit has been vibrated and filled, valve 45 is closed, switch 56 turned off and drain lines 46 and 48 disconnected and the unit removed from the resin transfer plant after which the filler plug 36 is placed in the filler opening on top of the unit.

Figure 8:
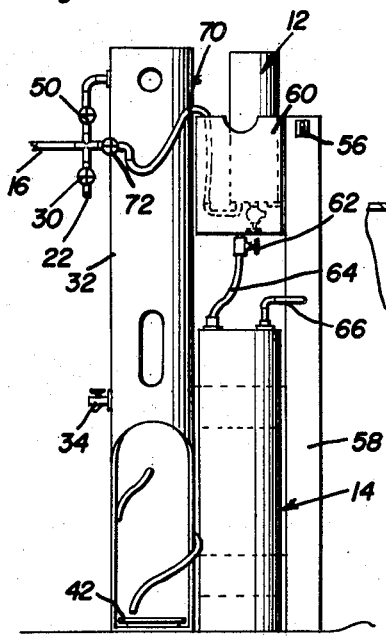
FIGURE 8 is a front view illustrating the manner of flushing the service unit into the canister.
Figure 9:
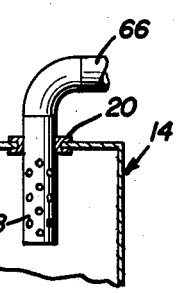
FIGURE 9 is a detailed sectional view illustrating one of the fittings connected to the canister when receiving material from the service unit.
Figure 10:
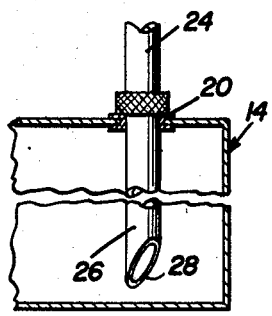
FIGURE 10 is a detailed sectional view of the canister illustrating the elongated tube inserted therein.

Before the service unit was filled from the transfer plant, it was sterilized with a chlorine solution. The service unit is then ready for service and due to the vibration factor, the greatest possible capacity will be obtained from each service unit. However, when the service unit has exceeded its capacity as indicated by the signal indicator disclosed in the abovementioned co-pending applications, an exchange of units is made and the unit containing exhausted resins returned to the resin transfer plant. An empty shipping canister 14 is then placed under the open topped vessel or tank 60 as illustrated in FIGURE 8 and valve 62 is connected with port 18 in the canister 14 by virtue of a conduit 64. The other port 20 is provided with a vent 66 having a screened insert 68 extending into the top of the canister 14 for venting the canister.

The filler plug is removed from the service unit 12 and the service unit is inverted on the top of the vessel or tank 60. A plastic tube 70 is connected to the outlet 40 of the service unit 12 and to a valve 72 by which water may be discharged into the service unit through the outlet 40 when in inverted position as illustrated in FIGURE 8. This assembly will enable the service unit to be completely rinsed of exhausted resins so that the exhausted resins will discharge into the vessel 60 whereby opening of valve 62 will allow the resins to pass from the vessel 60 into the shipping canister 14. The screen vent 68 allows overflow water to go to a drain with the screen preventing any resin from leaving the shipping canister. When the shipping canister is filled with exhausted resins, it is capped and sent back to a regeneration station. The vessel 60 may have sufficient capacity for several service units and the transfer plant provides for efficient, clean transfer of demineralization resins without the necessity of the distributor operating his own regeneration facilities. While the present invention has been primarily disclosed for the use of distributors of service units for demineralized water, it can be readily employed wherever it is desired to transfer water conditioning ingredients from a shipping container or supply vessel into a service unit and for transferring exhausted water conditioning ingredients from a service unit into an empty shipping container or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for transferring water conditioning agents comprising a vertically disposed filler tank, flexible hose means connected to the filler tank for connection with a regenerated water conditioning agent supply canister, means communicating a water supply with the water conditioning agent supply canister for hydraulically forcing the water conditioning agents into the filler tank, a vibrating platform under said filler tank, and means connected with the filler tank for filling a service unit disposed on the vibrating platform whereby the water conditioning agents from the filler tank will completely fill the service unit.

2. The structure as defined in claim 1 wherein said filler tank is provided with an open topped vessel disposed alongside the filler tank for receiving exhausted agent from a service unit, means communicating the vessel with an empty canister for discharging the exhausted agent from a plurality of service units into a canister for shipment to a regeneration plant.

3. The method of transferring water conditioning agent from a shipping canister to service units comprising the steps of hydraulically discharging regenerated agents from the canister into a filler tank, filling a plurality of empty service units from the filler tank while simultaneously vibrating the service units for completely filling the same thereby providing maximum capacity to the service units.

4. A device for filling a canister with exhausted water treating agents comprising a vessel supported in elevated position for receiving an inverted service unit, means in the bottom of said vessel communicating it with an underlying canister capable of receiving the agents from a plurality of service units, and means communicating with a water supply for introducing water into an inverted service unit disposed on the vessel for hydraulically pumping the exhausted agents from the service unit into the vessel.

5. A device for transferring regenerated water treating agents from a supply canister to a plurality of service units comprising a filler tank capable of receiving regenerated agents of a quantity to fill a plurality of service units, means communicating the filler tank with a supply canister of regenerated water treating agents, and water supply means adapted to be communicated with the canister for hydraulically pumping the agents from the supply canister into the filler tank, and discharge means at the lower end of the filler tank for supplying regenerated agents to a plurality of service units communicated sequentially with the discharge means.

6. The structure as defined in claim 5 together with a vibrating platform located under the discharge means of the filler tank whereby each service unit is placed on the vibrating platform for agitating the unit as it is filled for compacting the agents in the service unit.

7. The structure as defined in claim 6 together with an open top vessel supported on the filler tank adjacent the upper end thereof for receiving sequentially a plurality of inverted service units, means in the bottom of said vessel for communicating with an empty canister for discharging exhausted water treating agents from the vessel into a canister, and water supply means for attachment to each inverted service unit for hydraulically pumping the exhausted agents from the service unit into the vessel.

8. The method of handling water conditioning agents consisting of the steps of supporting in a vessel an inverted service unit having exhausted water conditioning agents therein with the top end of the service unit disposed adjacent the bottom of said vessel, hydraulically discharging exhausted agents from the inverted service unit into the vessel, and moving the service unit from its position with the top within the vessel towards a position with the top of the service unit at the top of the vessel hereby enabling the treating agents to discharge into the vessel.

References Cited by the Examiner
UNITED STATES PATENTS

| | | | |
|---|---|---|---|
| 682,236 | 9/01 | Brown | 141—18 |
| 868,605 | 10/07 | Heybach | 141—12 |
| 1,266,706 | 5/18 | Nickle | 141—72 |
| 2,656,963 | 10/53 | Krueger | 141—12 X |
| 2,755,969 | 7/56 | Rainero | 141—25 |
| 2,780,247 | 2/57 | Claassen | 141—12 X |
| 2,850,046 | 9/58 | Suellenthrop | 141—72 X |
| 3,045,717 | 7/62 | Vogt | 141—12 |

FOREIGN PATENTS

| | | |
|---|---|---|
| 550,844 | 12/22 | France. |
| 20,370 | 9/03 | Great Britain. |
| 834,930 | 5/60 | Great Britain. |

LAVERNE D. GEIGER, *Primary Examiner.*